United States Patent Office 3,421,156
Patented Jan. 7, 1969

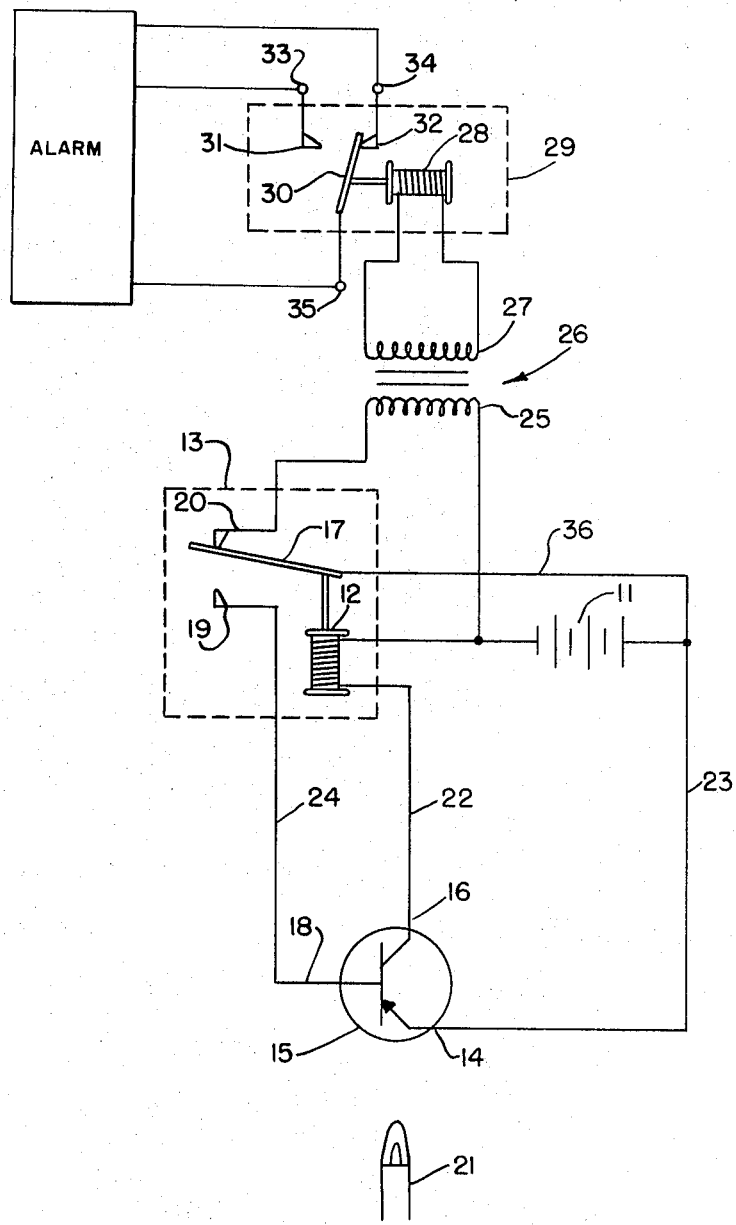

3,421,156
SELF-CHECKING DETECTOR
William G. Rowell, Milton, Mass., assignor to Technical Marketing Associates, Inc., Concord, Mass., a corporation of Massachusetts
Filed Dec. 18, 1964, Ser. No. 419,385
U.S. Cl. 340—228
Int. Cl. G08b 21/00; H03k 3/42; H03k 19/14
6 Claims The present invention relates generally to detecting systems and more specifically to an improved apparatus for self-checking the integrity of a condition monitoring system through the use of a checking signal created in a unique and novel manner.

Prior art devices, as exemplified by Patents Nos. 2,798,213; 2,798,214 and 2,804,008, all by the present inventor, are known and are presently in use. The first of these patents teaches that a system may be made self-checking by providing a checking by providing a checking signal by repetitively switching the sensor output signal on and off. The second patent provides a checking signal by repetitively externally exposing the sensor to a condition simulating the condition it is to sense, while the third patent provides a checking signal by utilizing the inherent fluctuations in the condition that the sensor is to sense.

In common with the above inventions, the present invention is also concerned with a method and means for self-checking the condition monitoring system and particularly is concerned with the problem of providing warning signal and/or corrective action upon occurrenec of a predetermined codition sensed or when a component failure occurs in the system. It is well realized in industry that sooner or later a component will eventually fail and that when a component in such a system fails, the system fails. Therefore, a prime concern of this invention is whether the component will cause the system to fail in a safe manner or in an unsafe manner.

For purposes of definition as herein used we may define a safe failure as the type of failure whereby the condition monitoring system provides a false signal thereby falsely indicating that the event to be detected has occurred while actually this condition was caused by component failure. While this safe failure may be classified as a nuisance failure due to unnecessarily stopping the monitored process or event, nevertheless it is a safe failure. An unsafe failure, on the other hand, is the type of failure created when a component fails in the condition monitoring system in such a manner that no indication of the failure whatsoever is produced. Thus, the entire monitoring system will be completely inoperable and incapable of monitoring the condition or process. In such an event the system has completely lost control and nothing will occur to prevent a run-away situation that can end in catastrophe.

The present invention has further advantages and features in that the entire system, its components, including the wires and connections thereto, are automatically self-checked throughout the life of the system. The system further provides an appropriate indication of a failure in the system or in any component part thereof.

The system further provides for a unique failsafe system utilizing a photosensor in which the dark current effect so troublesome in prior art systems is hereby eliminated, thus increasing the sensitivity and reliability of the present system. The present invention therefore provides a novel, simple, inexpensive, reilable, failsafe, self-checking, indicating, monitoring, controlling, recording, or other supervising system, that is applicable for the detection of various predetermined conditions directly, indirectly or inferentially such as electromagnetic radiation, level detection, flow detection, flame detection, thermal detection, light detection, movement detection, proximity detection, and the like, it accomplishes these objects and features by use of a self-produced oscillation in the system. This self-oscillation is utilized to create a checking signal that can be monitored. This checking signal is produced by repetitively feeding the reverse biasing current internally through the sensing element itself to thereby cause a state of oscillation to exist in the system at a predetermined frequency. This checking signal so produced is then monitored in a failsafe manner whereby loss of the checking signal causes an appropriate predetermined action to occur. The creation of the checking signal has a further advantage in that the dark current so troublesome in prior art devices and systems is eliminated by the bias current applied to the sensor.

Various prior techniques which solved the dark current problem required the use of means to chop the light beam to produce an AC signal without dark currents or utilized a balanced bridge arrangement to balance out the dark current.

The present invention, however, resolves this problem inherently by utilizing the checking signal described above.

These and other important objects and features and advantages which are provided by the present invention will become apparent to those skilled in the art upon reference to the following specification taken in conjunction with the single drawing which is a schematic presentation of the preferred embodiment of the present invention.

Referring now to the drawing, the invention is first illustrated as applied to a flame detector. An important application of such a device may be, for example, in an oil burner wherein it is necessary to detect the flame of the burner for various purposes.

A DC power source such as battery 11 has its negative terminal connected to one end of the coil 12 of relay 13 and its positive terminal connected to the emitter 14 of a PNP phototransistor 15. The collector 16 of phototransistor 15 is connected to the other end of coil 12. Also connected to the positive terminal of battery 11 is a lever contact 17 which forms a portion of relay 13 and is associated with coil 12. The base 18 of transistor 15 is connected to a contact 19 associated with lever contact 17. As should be obvious to one skilled in the art, a NPN phototransistor can be substituted for the described PNP phototransistor. A second contact 20 is also associated with lever contact 17. The second contact 20 may be connected to the primary 25 of a step-up transformer 26 whose secondary 27 is connected across a coil 28 of a slow release relay 29 which has a lever contact 30, contacts 31 and 32, and terminals 33, 34, and 35 associated therewith. An alarm system may be appropriately connected across terminals 33, 34 and 35 to give an indication of a failure anywhere in the system.

The device operates in the following manner: when the phototransistor 15 is positioned such that the radiant energy, in the form of light from a flame 21, impinges upon the phototransistor, an increase in current flow in the collector/emitter circuit of the transistor 15 occurs. Such an increase in current flow is well known in the prior art and need not be explained here. If the illumination from the flame 21 is of sufficient intensity, the ohmic resistance between the emitter 14 and the collector 16 of transistor 15 falls causing a current to flow from battery 11 through coil 12. When the current flow through coil 12 is of a predetermined value, the relay 13 is pulled in such that the lever contact 17 normally making with contact 20 breaks with contact 20 and makes with contact 19. When lever contact 17 makes with contact 19 the base 18 of phototransistor 15 is now connected directly to the positive terminal of battery 11. The connecting of battery 11 to base 18 applies a reverse bias current to the phototransistor 15 causing the phototransistor 15 to immediately change from a conducting state to a non-conducting state. When this occurs the relay coil 12 is cut off and drops out causing lever contact 17 to break with contact 19 and make with contact 20. This cycle continuously repeats itself so long as the aforementioned radiant energy is falling upon the sensor and will continue until a component fails or until the radiant energy ceases.

The above-described oscillation will occur at a frequency determined by the frequency response characteristics of the relay 13 as well as by the frequency response characteristics of photosensor 15.

A working model of the oscillating portion of the present invention has been constructed providing satisfactory performance in every respect and utilizing the following specific "off-the-shelf components": battery 11, Burgess 9 volt battery; relay 13, Sigma relay #41 FZ–500 ACS–SIL, 500 ohm coil, 19 volt AC; photosensor 15, phototransistor PNP, Radio Shack Catalog #27–847.

The above-described components of the system resulted in a frequency of the checking signal of approximately 100 c.p.s. This frequency can, of course, be either increased or decreased by selecting appropriate relays or other switching means such as a non-mechanical solid state switch. The choice of components listed above as well as the choice of the other components such as relay 29 and transformer 26 would be influenced by the specific application requirements and may readily be accomplished by one skilled in the art.

The normal signal provided by the above-disclosed system is in the form of a distinctive audible buzzing produced by the rapid on and off operating of relay 13. This checking signal produced by the oscillation may be monitored in countless ways, for example, by coupling the primary 25 of transformer 26 across the battery 11 and contact 20 with its secondary 27 coupled across a coil 28 of relay 29.

The rapid making and breaking of lever contact 17 with contacts 19 and 20 of relay 13 will energize the primary winding 25 of step-up transformer 26. A stepped-up voltage is thereby generated in secondary winding 27 which in turn is fed to coil 28 of slow release relay 29. As long as this pulsating stepped-up voltage is applied to coil 28, the relay 29 remains energized holding lever contact 30 in contact with contact 32. Appropriate signalling, indicating, detecting or alarm apparatus can be connected to terminals 33, 34 and 35 to give an indication of a failure in the system. Inasmuch as a number of alarm, indicating or other detecting means are available to the industry to monitor the operation of the checking signal, it is felt that they need not be repetitiously set forth here since the choice or design of such apparatus is well within the ability of one skilled in the art.

The invention, therefore, provides a means whereby an open circuit or a short circuit or any other possible component failure anywhere in the system would result in a loss of the checking signal. For example, if the lead wires 22 and 23 connected between the collector and one end of coil 12 and the emitter 14 and the positive terminal of battery 11 respectively become shorted, or if the phototransistor 15 itself becomes shorted internally, the lever contact 17 of relay 13 will break with contact 20 and make with contact 19. Since the corrective bias applied to base 18 will have no effect on phototransistor 15, the relay coil 12 will continue to hold lever contact 17 making with contact 19. In this manner, the checking signal stops which in turn causes the audible buzz to cease.

Such a cessation of the checking signal also occurs if wire 24 connected to base 18 and contact 19 is shorted to wire 22. In such an event, a forward bias is applied to phototransistor 15 causing it to conduct heavily and thus hold in lever contact 17 making with contact 19. If wires 23 and 24 are shorted, a reverse bias is applied to the sensor which prevents it from conducting and thereby keeps the checking relay dropped out with consequent loss of checking signal. Further, if lever contact 17 fails to break with contact 20, the primary winding 25 will see a steady-state DC voltage which, in turn, de-energizes relay 29 since a pulsating DC current is required to hold relay 29 energized. The converse also results in de-energizing of relay 29 for when lever contact 17 remains in contact with contact 19, no voltage whatsoever is applied across the transformer to coil 28 of relay 29.

By selection, relay 29 may be made only to operate at a stepped-up voltage and thus failure of transformer 26 will also cause the release of relay 29. It can thus be clearly seen that any combination of grounds, shorts or open circuits in the wires or in the phototransistor, will cause the device to fail in a safe manner.

Pertinent electrical characteristics of the invention are as follows:

With relay dropped out, dark current 3.0 ma.—Dark voltage 1.5 v.
With relay pulled in, dark current 0.25 ma.—Dark voltage 0.25 v.
Relay pull in current 4.75 ma.—Relay pull in voltage 2.25 v.
Relay drop out current 1.0 ma.—Relay drop out voltage 0.5 v.

During normal operation with the checking signal present the average current was 3 ma. and the average voltage was 1.5 v.

The above readings were all obtained with an ammeter connected in series with the coil 12 and a voltmeter connected across the coil 12.

It can thus be seen from the above electrical readings that the relay 13 required 4.75 ma. to pull in, and once it pulled in, would not drop out until the current dropped to 1.0 ma. This meant, of course, that the dark current was three times greater than the drop out current and would thus falsely hold in the relay, even when the sensor was covered from any ambient light whatever. This high dark current appeared typical in the inexpensive sensors tested, however, no doubt a high grade premium preselected sensor would have much better dark current characteristics. To utilize a system in the prior art having these undesirable characteristics, means that it would be necessary to reduce the power applied to the sensor until the dark current dropped below the drop out current for the relay, or apply a constant reverse bias to the sensor. This would mean a drastic reduction in the detection sensitivity of the system would occur unless compensated by use of sufficient amplification.

It will be noted that in the present invention the dark current dropped to .25 ma. when the checking relay pulled in, which is but ¼ of the hold in current for this relay.

In the interest of keeping this disclosure as simple as possible, all unnecessary elements such as alarms, controlling and recording devices, amplifiers, etc. have been omitted. If desired, it is well within the ability of one skilled in the art to utilize as much amplification as required for any particular application.

It may be of interest to point out that equally satisfactory results were obtained when time controlled contacts were utilized as the switching mechanism, instead of the relay switches 17, 19 and 20.

It is particularly pointed out that types of system components other than those specifically disclosed could be used as well, and undoubtedly would be, in many applications without departing from the spirit and scope of the invention. For example, solid state components such as photojunction light sensors, including photodiodes, light activated silicon controlled rectifiers, PNPN light operated switches, photosensitive field effect transistors, PNP and NPN phototransistors, etc., lend themselves readily for use in the present invention. Also solid state switches, in place of the mechanical relay disclosed, such as the silicon controlled rectifier, the gate controlled switch, Zener regulator switch, silicon diode switch, power transistor, etc., are but a few examples of the wide variety of semiconductor or solid state switching devices available in the art that can readily be utilized in the present invention and the type selected is purely a matter of choice.

Inasmuch as most transistors and semiconductors in general are quite temperature sensitive, they could be readily adapted for use as sensors to detect predetermined temperature excursions or conditions by utilizing the fail-safe self-checking manner disclosed in this invention. Thus, the detection of a predetermined temperature or a predetermined rate of thermal transfer to or from the sensor would cause the checking signal to cease or change its frequency. In this case, the transistor could be normally biased to the conducting state and when the relay 13 pulled in, its contacts could either remove the forward bias or replace it with a reverse bias to cause the system to oscillate and thereby produce a checking signal in the manner herein disclosed. The cessation or change in the checking frequency could then be monitored in any suitable manner. Unlimited possibilities seem to exist in the use of semiconductors as sensing devices, due to the great variety of solid state devices from which to choose.

In summation, the present invention teaches that the oscillation that can be produced by thermistor detectors, or sensors, can be used in a novel manner to thereby produce a checking signal for checking the integrity of the system. Accordingly, loss of the monitored checking signal would thereby indicate failure in the system or that the condition to be monitored has occurred.

As before stated and as before disclosed and demonstrated, the technique underlying the present invention is capable of practice with a host of different types of electrical, electronic, mechanical and electromechanical systems, and is entirely independent of any specific kind of device used. Therefore, further modifications will occur to those skilled in the art, and all such are considered to fall within the spirit and scope of the invention as defined in the appended claims.

What is claimed is:

1. A condition monitoring apparatus comprising a single pole double throw relay, a DC power source and a phototransistor having its collector series connected through the relay coil to the negative terminal of the power source, its emitter connected to the positive terminal of the power source and its base connected to a normally open contact of the relay such that upon application of energy causing said phototransistor to reduce its internal resistance said relay coil closes said contact and applies a positive voltage pulse to said base shutting off said phototransistor and increasing its internal resistance which in turn opens said contact whereby the described cycle continues to repeat so long as said energy is applied to said phototransistor.

2. A condition monitoring apparatus comprising a single pole double throw relay, a DC power source and a phototransistor having its collector series connected through the relay coil to the negative terminal of the power source, its emitter connected to the positive terminal of the power source and its base connected to a normally open contact of the relay such that upon application of energy causing said phototransistor to reduce its internal resistance said relay coil closes said contact and applies a positive voltage pulse to said base shutting off said phototransistor and increasing its internal resistance which in turn opens said contact whereby the described cycle continues to repeat so long as said energy is applied to said phototransistor.

3. A self-checking condition monitoring system comprising a first single pole double throw relay, a DC power source, a phototransistor, a step-up transformer, a second single pole double throw relay, said phototransistor having its collector connected through the coil of said first relay to the negative terminal of said power source, its emitter connected to the positive terminal of said power source and to the lever contact of said first relay, and its base to the normally open contact of said first relay, said transformer having its primary winding connected between the normally closed contact of said first relay and the negative terminal of said power source and its secondary winding connected across the coil of said second relay and alarm means connected across the contacts of said second relay whereby upon detection of radiant energy by said phototransistor the internal resistance of said transistor is reduced causing said first relay to pull in to apply a positive voltage pulse to said base raising said internal resistance of said transistor causing said first relay to release and the cycle to repeat, said second relay being activated only upon failure of said cycle and said alarm being activated only upon activation of said second relay.

4. A self-checking condition monitoring system comprising a first single pole double throw relay, a DC power source, a phototransistor, a step-up transformer, a second single pole double throw relay, said phototransistor having its collector connected through the coil of said first relay to the positive terminal of said power source, its emitter connected to the negative terminal of said power source and to the lever contact of said first relay, and its base to the normally open contact of said first relay, said transformer having its primary winding connected between the normally closed contact of said first relay and the positive terminal of said power source and its secondary winding connected across the coil of said second relay and alarm means connected across the contacts of said second relay whereby upon detection of radiant energy by said phototransistor the internal resistance of said transistors is reduced causing said first relay to pull in to apply a negative voltage pulse to said base raising said internal resistance of said transistor causing said first relay to release and the cycle to repeat, said second relay being activated only upon failure of said cycle and said alarm being activated only upon activation of said second relay.

5. A fail-safe self-checking condition monitoring system, comprising:
   a DC power source;
   a condition sensor having output terminals and a control terminal;
   voltage sensitive switching means having first and second switch positions; and
   alarm means;
   an output circuit comprising, in series, said voltage sensitive switching means, said power source and said output terminals;
   said control terminal being connected to said power source when said switching means is in said first switch position;
   said alarm means being connected across said power source when said switching means is in said second switch position;
   said output circuit being disabled when said condition sensor is exposed to a first external condition and being enabled when said condition sensor is exposed to a second external condition;
   said output circuit being biased to a first state when said switching means is in said first switch position and being biased to a second state when said switching means is in said second switch position;
   said output circuit being rendered conducting only when enabled by said sensor being exposed to said second external condition and when said switching means is in said second switch position, and not otherwise;
   said voltage sensitive switching means assuming said first switch position when said output circuit is conducting and assuming said second switch position when said output circuit ceases to conduct;

whereby an alternating checking signal having a predetermined period is provided across said alarm means;

said alarm means being arranged to provide an alarm in the absence of said checking signal of said predetermined period;

said alarm means being arranged to preclude an alarm in response to application thereto of said checking signal of said predetermined period.

6. The condition monitoring system as recited in claim 5, wherein:

said condition sensor is a phototransistor; and said voltage sensitive switching means is a relay having at least a single pole operative between first and second contacts, said pole being in engagement with said first contact in said first switch position and in engagement with said second contact in said second switch position.

References Cited

UNITED STATES PATENTS

| | | | |
|---|---|---|---|
| 2,798,213 | 7/1957 | Rowell | 340—253 X |
| 3,202,976 | 8/1965 | Rowell | 340—409 |

JOHN W. CALDWELL, *Primary Examiner.*

D. MYER, *Assistant Examiner.*

U.S. Cl. X.R.

340—253; 317—130; 315—136; 307—311

FO-1050
(5/69)

UNITED STATES PATENT OFFICE
CERTIFICATE OF CORRECTION

Patent No. 3,421,156    Dated January 7, 1969

Inventor(s)    William G. Rowell

It is certified that error appears in the above-identified patent and that said Letters Patent are hereby corrected as shown below:

In Column 1, line 18, delete the second occurrence of "by providing a checking." In Column 5, line 62, "negative" should read --positive--; in line 63 "positive" should read --negative--; and in line 68 "positive" should read --negative--.

SIGNED AND
SEALED
JAN 20 1970

(SEAL)
Attest:

Edward M. Fletcher, Jr.
Attesting Officer

WILLIAM E. SCHUYLER, JR.
Commissioner of Patents